(12) United States Patent
Biers, Sr.

(10) Patent No.: US 8,777,263 B2
(45) Date of Patent: Jul. 15, 2014

(54) LANDSCAPING MACHINE, LANDSCAPING MACHINE COVER, AND METHOD OF USE THEREOF

(76) Inventor: John E. Biers, Sr., Feura Bush, NY (US)

(*) Notice: Subject to any disclaimer, the term of this patent is extended or adjusted under 35 U.S.C. 154(b) by 0 days.

(21) Appl. No.: 13/537,858

(22) Filed: Jun. 29, 2012

(65) Prior Publication Data

US 2014/0000667 A1    Jan. 2, 2014

(51) Int. Cl.
*E04H 15/04* (2006.01)
*B60R 21/13* (2006.01)

(52) U.S. Cl.
USPC .............. 280/756; 135/88.09; 135/88.01

(58) Field of Classification Search
USPC .............. 280/756; 135/88.11, 88.04, 88.05, 135/88.08, 88.13, 90; 296/136.03, 136.1, 296/98, 136.01, 136.07, 136.11, 136.05, 296/136.12, 136.08; 297/219.1; D12/401, D12/403; 114/361; 150/166; 160/370.22, 160/370.21; 52/3
See application file for complete search history.

(56) References Cited

U.S. PATENT DOCUMENTS

| | | | | |
|---|---|---|---|---|
| 1,157,115 | A * | 10/1915 | McIntyre | 135/88.09 |
| 3,050,075 | A * | 8/1962 | Kaplan et al. | 296/98 |
| 3,383,133 | A * | 5/1968 | Dean | 296/98 |
| 3,718,225 | A * | 2/1973 | Duren | 414/462 |
| 3,791,668 | A * | 2/1974 | Adams | 280/756 |
| 4,538,752 | A * | 9/1985 | Welter | 224/309 |
| 4,929,016 | A * | 5/1990 | Kastanis | 296/136.03 |
| 5,052,738 | A | 10/1991 | Li | |
| 5,393,194 | A * | 2/1995 | Smith | 414/546 |
| 5,516,181 | A * | 5/1996 | Thompson | 296/98 |
| D396,843 | S | 8/1998 | Mifsud | |
| 5,795,009 | A | 8/1998 | Sack et al. | |
| 5,820,200 | A | 10/1998 | Zubillaga et al. | |
| 5,983,824 | A * | 11/1999 | Hernandez | 114/361 |
| 6,158,805 | A * | 12/2000 | Blaney | 297/184.11 |
| 6,412,851 | B1 | 7/2002 | Burks et al. | |
| 6,439,150 | B1 * | 8/2002 | Murphy et al. | 114/361 |
| 6,505,880 | B1 * | 1/2003 | Castro | 296/102 |
| 6,513,858 | B1 * | 2/2003 | Li et al. | 296/98 |
| 6,517,111 | B2 * | 2/2003 | Mizuta | 280/756 |
| 6,662,849 | B1 * | 12/2003 | Hsiung | 160/122 |
| 6,672,643 | B1 * | 1/2004 | Brodskiy et al. | 296/98 |
| 6,682,123 | B2 * | 1/2004 | Burks et al. | 296/98 |
| 6,926,334 | B1 * | 8/2005 | Diehm | 296/83 |
| 6,981,509 | B2 | 1/2006 | Sharapov | |
| 7,000,671 | B2 * | 2/2006 | Biewer | 160/121.1 |
| 7,025,404 | B1 * | 4/2006 | Gilbert | 296/102 |
| 7,093,558 | B1 * | 8/2006 | Mandanici | 114/361 |
| 7,210,492 | B2 * | 5/2007 | Gerrie et al. | 135/88.07 |
| 7,281,752 | B2 * | 10/2007 | Wiegel et al. | 296/98 |
| 7,367,247 | B2 * | 5/2008 | Horiuchi et al. | 74/606 R |

(Continued)

*Primary Examiner* — Karen Beck
(74) *Attorney, Agent, or Firm* — Schmeiser, Olsen & Watts LLP

(57) ABSTRACT

Disclosed herein is a landscaping machine that includes a protective rollover bar having a left bar portion extending from a left side of an operator seat, a top bar portion extending from the left bar portion above the operator seat, and a right bar portion extending from the top bar portion to a right side of the operator seat. The landscaping machine further includes an elongated rotatable member affixed to the protective rollover bar, the elongated rotatable member extending from the left bar portion to the right bar portion. The landscaping machine further includes a covering system attached to the elongated rotatable member configured to be rolled and unrolled with rotation of the elongated rotatable member. Further disclosed is a landscaping machine cover attachable to a landscaping machine, and a method of use thereof.

17 Claims, 5 Drawing Sheets

(56) References Cited

U.S. PATENT DOCUMENTS

| | | | |
|---|---|---|---|
| 7,478,862 B2 * | 1/2009 | Wiegel et al. | 296/98 |
| D605,555 S * | 12/2009 | Tanaka et al. | D12/14 |
| D616,806 S * | 6/2010 | Patterson et al. | D12/401 |
| 7,862,100 B1 | 1/2011 | Smith | |
| 8,087,694 B2 * | 1/2012 | Johnson et al. | 280/756 |
| 8,418,678 B2 * | 4/2013 | Ochi et al. | 123/516 |
| 2002/0056980 A1 * | 5/2002 | Saczalski et al. | 280/748 |
| 2002/0096908 A1 * | 7/2002 | Tyrer et al. | 296/100.11 |
| 2002/0167192 A1 * | 11/2002 | Tyrer et al. | 296/100.11 |
| 2004/0238089 A1 * | 12/2004 | Li et al. | 150/166 |
| 2009/0108650 A1 | 4/2009 | Ditwiler | |
| 2011/0315178 A1 * | 12/2011 | Rothermich et al. | 135/88.01 |
| 2013/0186227 A1 * | 7/2013 | Sakurahara | 74/491 |
| 2013/0193710 A1 * | 8/2013 | Kimura et al. | 296/65.06 |

* cited by examiner

LANDSCAPING MACHINE, LANDSCAPING MACHINE COVER, AND METHOD OF USE THEREOF

FIELD OF TECHNOLOGY

The subject matter disclosed herein relates generally to landscaping machines. More particularly, the subject matter relates to a landscape machine having a cover, a cover for landscaping machines, and a method of use thereof.

BACKGROUND

Landscaping machines such as lawnmowers, tractors, bulldozers, loaders and the like are often kept outside over periods of time when not in use. For example, commercial landscaping companies may choose to store their machines on-sight when contracting to upkeep the landscape for large commercial properties. Landscaping machine dealers also leave landscaping machines outside on display prior to sale. Leaving a landscaping machine outside for an extended period of time subjects the landscaping machines to damaging elements such as sun, wind, rain, snow and hail. Over time, outside storage of landscaping machines lead to significant structural and cosmetic damage.

Thus, a landscaping machine having a covering system, a cover for landscaping machines, and a method of use thereof, would be well received in the art.

SUMMARY

According to a first described aspect, a landscaping machine comprises: a protective rollover bar having a left bar portion extending from a left side of an operator seat, a top bar portion extending from the left bar portion above the operator seat, and a right bar portion extending from the top bar portion to a right side of the operator seat; an elongated rotatable member affixed to the protective rollover bar, the elongated rotatable member extending from the left bar portion to the right bar portion; and a covering system attached to the elongated rotatable member configured to be rolled and unrolled with rotation of the elongated rotatable member.

According to a second described aspect, a landscaping machine comprises: an elongated rotatable member affixed to the landscaping machine at a location between a front end of the landscaping machine and a rear end of the landscaping machine, the elongated rotatable member extending from a left side of the landscaping machine to a right side of the landscaping machine; and a covering system attached to the elongated rotatable member configured to be rolled and unrolled with rotation of the elongated rotatable member, wherein the covering system includes a front covering portion and a rear covering portion, wherein the front covering portion is configured to extend to the front end of the landscaping machine in an unrolled state, and wherein the rear covering portion is configured to extend to the rear end of the landscaping machine in the unrolled state, wherein the front covering portion and the rear covering portion are rolled and unrolled simultaneously.

According to a third described aspect, a landscaping machine cover comprises: an elongated rotatable member affixable to a protective rollover bar of a landscaping machine; and a covering system attached to the elongated rotatable member configured to be rolled and unrolled with rotation of the elongated rotatable member, wherein the covering system includes a front covering portion and a rear covering portion, wherein the front covering portion is configured to extend in a first direction in an unrolled state, and wherein the rear covering portion is configured to extend in a second direction opposite the first direction in the unrolled state, wherein the front covering portion and the rear covering portion are rolled and unrolled simultaneously.

According to a fourth described aspect, a method of covering a landscape machine comprises: attaching an elongated rotatable member to a protective rollover bar of the landscaping machine, wherein the elongated rotatable member has an attached covering system, the covering system including a front covering portion and a rear covering portion; rotating the elongated rotatable member; unrolling the covering system such that the front covering portion extends to a front end of the landscaping machine and the rear covering portion extends to a rear end of the landscaping machine simultaneously; and rolling up the covering system from an unrolled state such that the front covering portion and the rear covering portion tightly surround the elongated rotatable member.

BRIEF DESCRIPTION OF THE DRAWINGS

The subject matter disclosed herein is distinctly claimed in the claims at the conclusion of the specification. The foregoing and other features and advantages are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
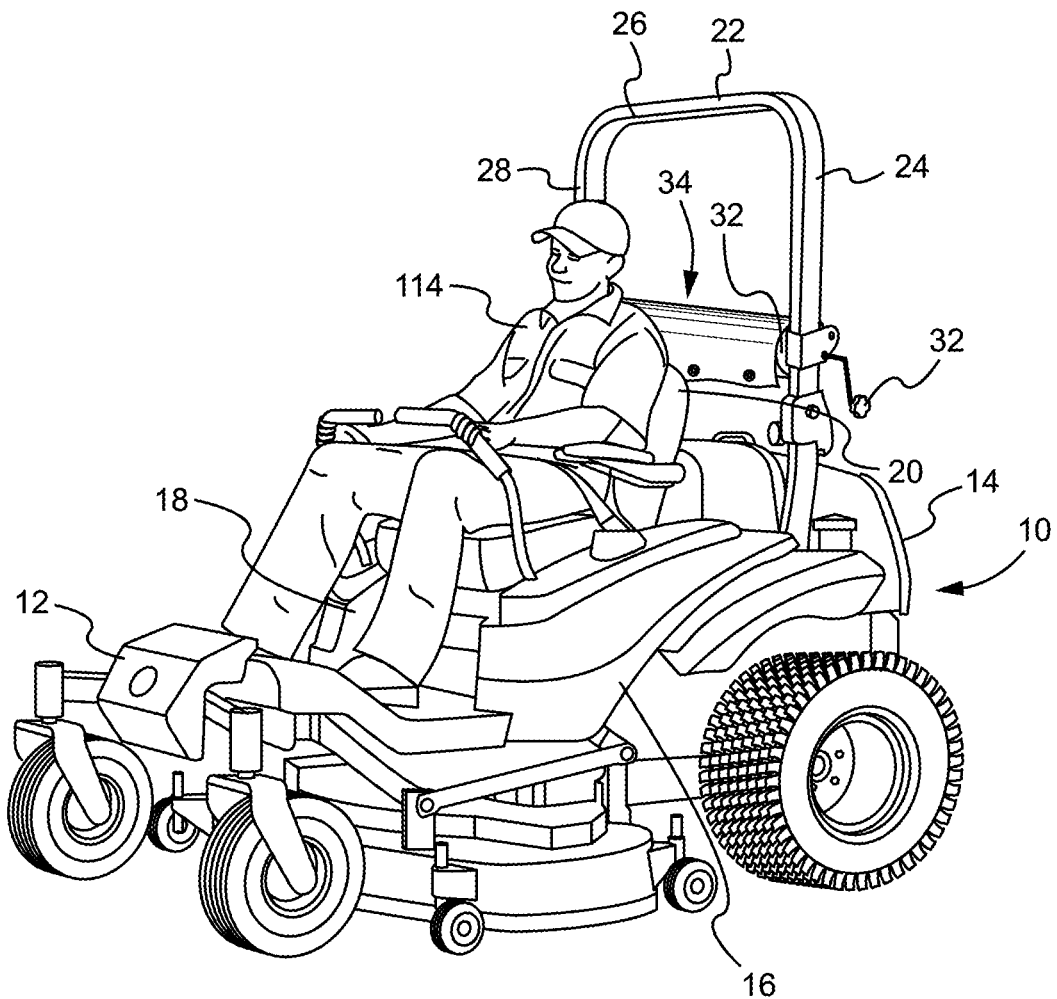
FIG. 1 depicts a perspective view of a landscaping machine in use according to one embodiment.

Referring firstly to FIG. 1, a perspective view of a landscaping machine 10 is shown. The landscaping machine 10 is shown to be a commercial riding lawnmower machine. The landscaping machine 10 includes a front end 12, a rear end 14, a left side 16 and a right side 18. The landscaping machine 10 includes an operator seat 20 and a protective roll bar 22. The protective roll bar 22 includes a left bar portion 24 extending from the left side 16 of the landscaping machine 10 immediately behind the left side of the operator seat 20. The protective roll bar 22 includes a top bar portion 26 extending from the left bar portion 24 above the operator seat 20 to a right bar portion 28. The right bar potion 28 extends from the top bar potion 26 to the right side 18 of the landscaping machine 10 immediately behind the right side of the operator seat 20. The protective rollover bar 22 may be configured to protect an operator sitting in operator seat 20 in the event that the landscaping machine 10 tips or rolls over.

The landscaping machine 10 further includes an elongated rotatable member 30 affixed to the protective rollover bar 22. The elongated rotatable member 30 extends from the left bar portion 24 of the protective rollover bar 22 to the right bar portion 28 of the protective rollover bar 22. The elongated rotatable member 30 may be made from a rigid material such as plastic or metal. The elongated rotatable member 30 may be rotated by an attached turnable handle 32. The turnable handle 32 may be attached outside the protective rollover bar 22 such that its rotation is not interfered with by the operator seat 20 or the protective rollover bar 22. The turnable handle 32 may cause direct rotation of the elongated rotatable member 30 such that one full 360 degree rotation of the turnable handle 32 results in a full 360 degree rotation in the elongated rotatable member 30. Gearing mechanisms may be introduced (not shown) within the structure of the elongated rotatable member 30 to provide for different rotational speeds between the elongated rotatable member 30 and the turnable handle 32 if desired.

Figure 2:
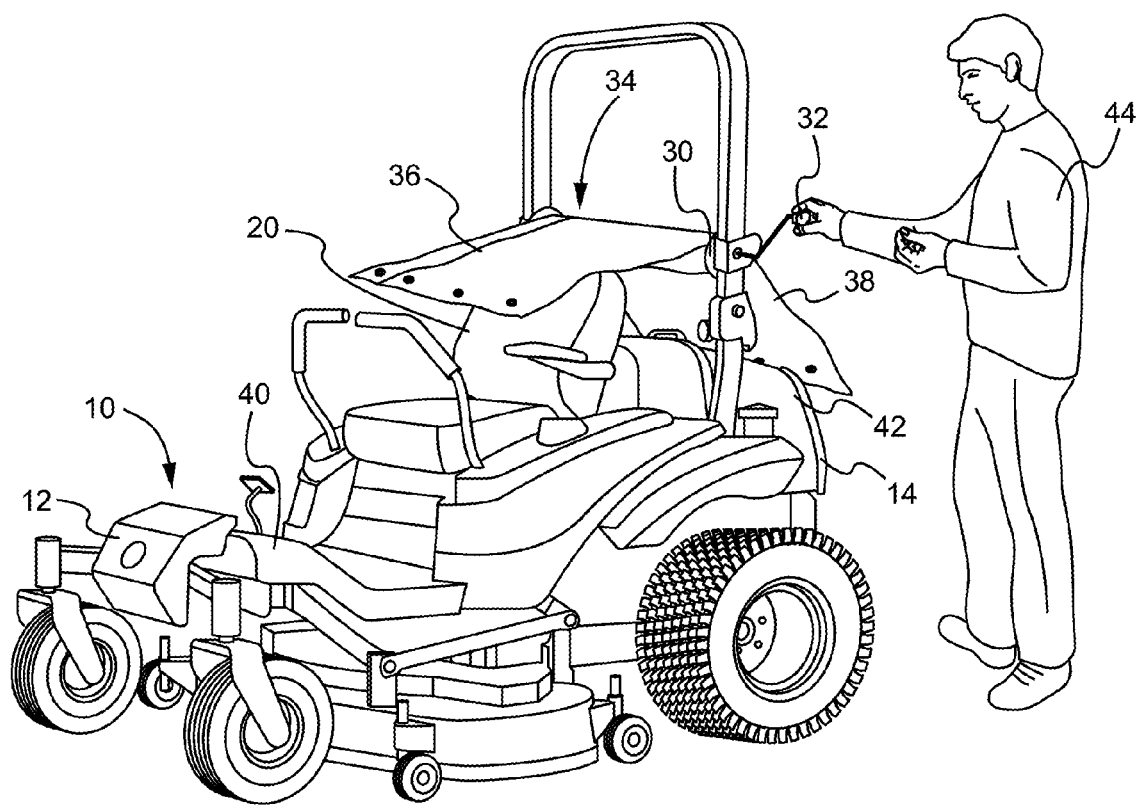
FIG. 2 depicts a perspective view of the landscaping machine of FIG. 1 with a user unrolling a cover according to one embodiment.
Figure 3:
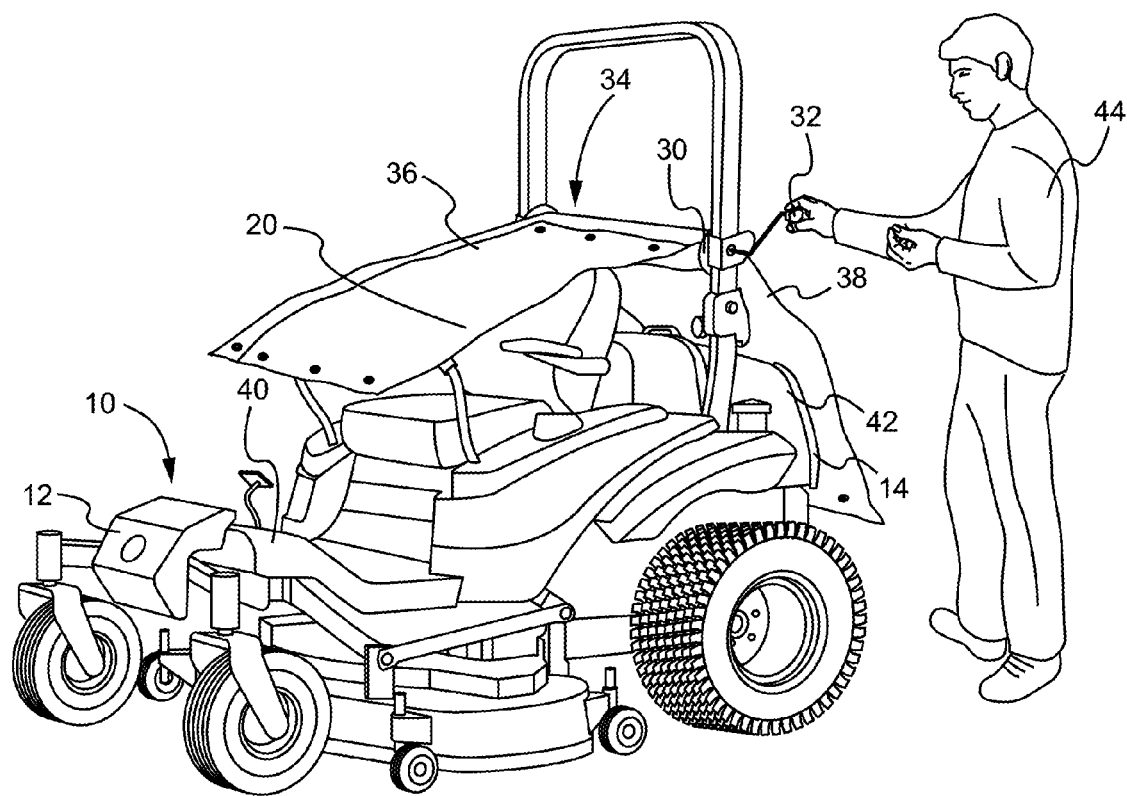
FIG. 3 depicts a perspective view of the landscaping machine of FIGS. 1-2 with the user unrolling farther the cover according to one embodiment.
Figure 4:
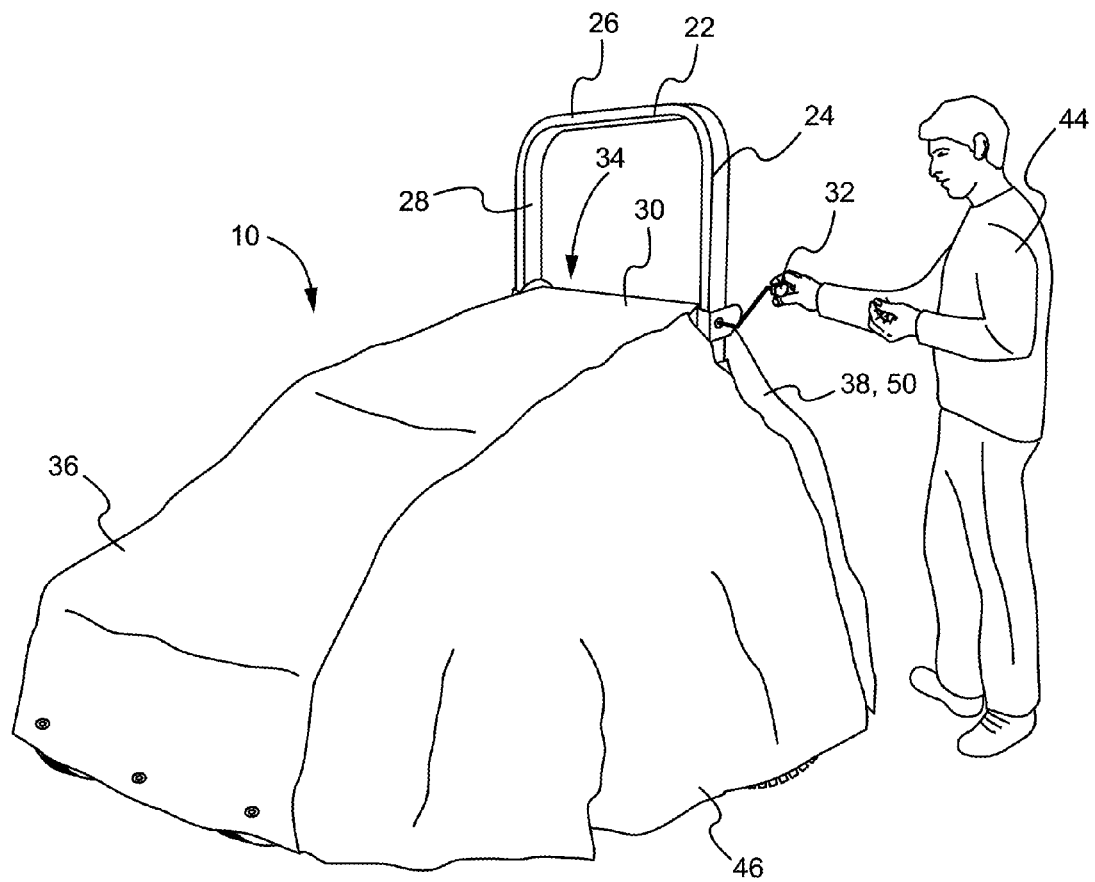
FIG. 4 depicts a perspective view of the landscaping machine after being fully covered according to one embodiment.

A covering system 34 may be attached to the elongated rotatable member 30. The covering system 34 may be configured to be rolled and unrolled with the rotation of the elongated rotatable member 30 that is enacted by the turnable handle 32. The covering system 34 may include a front covering portion 36 and a rear covering portion 38. The front covering portion 36 may be configured to cover a front 40 of the landscaping machine 10 when the front covering portion 36 is in an unrolled state, as shown in FIGS. 2-4. The rear covering portion 38 may be configured to cover a rear 42 of the landscaping machine 10 when the rear covering portion is in an unrolled state, as shown in FIGS. 2 - 4.

FIGS. 2 and 3 show an operator 44 that is in the process of covering the landscaping machine 10. In one embodiment, the operator 44 may rotate the turnable handle 32 in order to completely unroll the covering system 34. Then, once unrolled, the operator 44 may then drape the covering system 34 over the landscaping machine 10, as shown in FIG. 4. In other embodiments, the operator 44 may pull either the front covering portion 36 or rear covering portion 38 such that the pulling exacts rotation on the elongated rotatable member 30 to unroll the covering system 34. In some embodiments, the covering system 34 may be sufficiently rigid that it extends itself as it is unrolled by the operator 44. Alternately, the covering system 34 may be elastic enough that it needs to be pulled from the elongated rotatable member 30.

It should be understood that the front covering portion 36 and the rear covering portion 38 may be rolled and unrolled simultaneously by the operator 44. Thus, each of the front covering portion 36 and the rear covering portion 38 may be attached by one edge along the elongated rotatable member 30. An edge of the front covering portion 36 may be attached on a first side of the elongated rotatable member 30 and an edge of the rear covering portion 38 may be attached to a second side that is opposite the first side of the rotatable member 30.

The front covering portion 36 may further include a left unfoldable flap 46 and a right unfoldable flap (not shown). These unfoldable flaps 46, 48 may help to cover the left and right sides 16, 18, respectively of the front 40 of the landscape machine 10. It should be understood that the right unfoldable flap (not shown) may have the same or very similar dimensions to the left unfoldable flap 46. The flaps 46, 48 may then be folded back into a main body 50 of the front covering portion 36 prior to being rolled back into the elongated rotatable member 30. While the flaps 46, 48 are shown to be relatively flat additional sections of the front covering portion 36, it should be understood that the flaps 46, 48 may be particularly dimensioned to closely fit around the intended landscaping vehicle to be covered. As such, the dimensions shown are not limiting.

Similar to the front covering portion 36, the back covering portion 38 may also include a left unfoldable flap 50 and a right unfoldable flap (not shown). These unfoldable flaps 50 may help to cover the left and right sides 16, 18, respectively of the rear 42 of the landscape machine 10. Like the flaps 46, the flaps 50 may then be folded back into a main body 50 of the rear covering portion 38 prior to being rolled back into the elongated rotatable member 30. The flaps 50 may also be particularly dimensioned to fit the intended landscaping vehicle to be covered, as shown in FIG. 4. The covering portions 36, 38 may have particular cutouts, concaves, or the like to accommodate protruding portions of the landscaping machine 10. The entire covering system 34 including the front covering portion 36 and the rear covering portion 38 may be dimensioned to tightly fit around the dimensions of the particular landscaping machine that the covering system 34 is intended to cover.

The covering system 34 and the elongated rotatable member 30 may be protected by a protective housing (not shown) in some embodiments. This housing may be configured t be stationary as the elongated rotatable member 30 is rotated from within. A portion of the front covering portion 36 and the rear covering portion 38 may protrude from within the protective housing even when the covering system 34 is completely rolled up. This may allow an operator to pull the covering portions 36, 38 out of the protective housing in order to unroll the covering system 34. The protective housing may be removable and attachable to the elongated rotatable member 30 such that an operator can remove the housing if necessary to reveal the elongated rotatable member 30. In other embodiments, the protective housing may be an integral component of the covering system 34.

While the covering system 34 is shown attached at a particular height between the protective rollover bar 22, it should be understood that this is simply an exemplary embodiment. The covering system 34 may be attached to the protective rollover bar 22 either higher or lower on the protective rollover bar. In one embodiment, the covering system 34 may be attached at the top of the protective rollover bar 22. In another embodiment, the covering system 34 may be attached just above the top of the operator seat 20 such that it can be pulled directly over this portion of the machine 10 in use. In still other embodiments, the covering system 34 may be attached to a completely different portion of the machine 10. For example, in other landscaping machines 10 that are rollover risks and do not include a protective rollover bar, the covering system 34 may be attached at another appropriate location. For example, a support (not shown) may be created to attach to the existing structure of a landscaping machine where the support is configured to hold the covering system 34. The support and covering system 34 may be, for example, attached to a midpoint of the landscaping machine in order to take advantage of the covering system extending in both the forward and rearward directions.

The covering system 34 may be made of both woven and non-woven materials. These materials may prevent sunlight, wind, and rain from touching the inside of the landscaping machine 10. For example, in on embodiment, a plastic material may be used. In other embodiments, the cover may be made of a woven polyester vinyl material. In other embodiment, the covering system 34 may include multiple layers to ensure protection. These layers may be fixed together in order to provide for a single cover portion that is rollable and unrollable by the elongated rotatable member 30. The covering system 34 may also be used as an advertisement of the manufacturer of the landscaping machine 10. Alternately, the covering portion 34 may advertise a landscaping company that owns the landscaping machine 10.

The covering system 34 may actually attach to the landscaping machine 10 at one or more locations after it has been unrolled. This may prevent the covering system 34 from moving or uncovering portions of the landscaping machine 10 and undesirably exposing the landscaping machine 10 to the elements. Furthermore, the front covering portion 36 of the covering system 34 may be attached to the rear covering portion 38 to prevent any moisture from penetrating through the covering system 34 between any open spaces that may develop between the front covering portion 36 and the rear covering portion 38.

Figure 5:
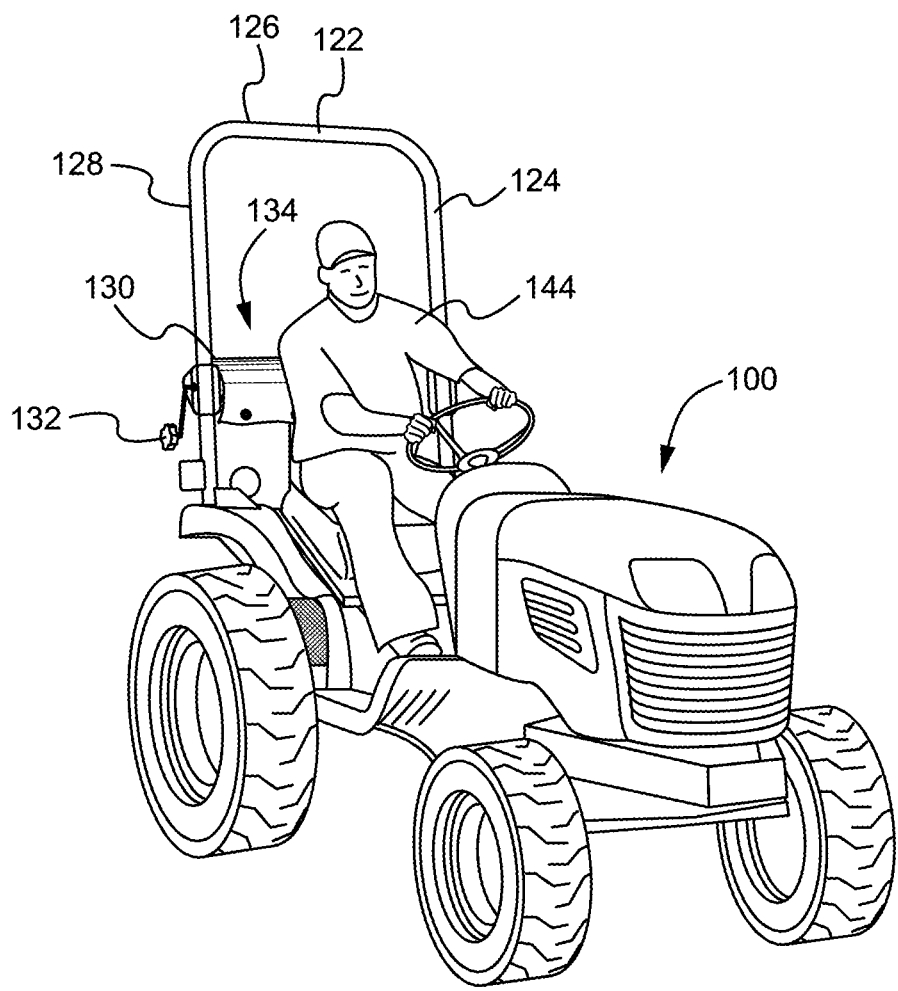
FIG. 5 depicts a perspective view of a tractor in use according to one embodiment.

Referring now to FIG. 5, a tractor 100 is shown being driven by an operator 144. The tractor 100 is shown employing a covering system 134 attached between a protective rollover bar 122 having a left bar portion 124, a top bar portion 126 and a right bar portion 126, similar to the protective rollover bar 22 described hereinabove. The covering system 134 may be similar to any of the embodiments described hereinabove for implementation on the lawnmower landscaping machine 10. This embodiment is meant to show that the present invention may be applied to any outdoor machine such as a tractor, loader vehicle, skid steer, bulldozer or the like. Moreover, in other embodiments, the landscaping machine 10 may also be an automobile, truck, or motorcycle in other embodiments. The tractor 100 is shown having a turnable handle 132 for turning an elongated rotatable member 130, similar to the embodiment described hereinabove. The covering system 134 may include a front covering portion and a rear covering portion (not shown) and respective flaps (not shown), similar to the embodiment described hereinabove. Like the covering system 34 described hereinabove, the covering system 134 may be configured to fully cover the entire tractor 100 when the tractor is not in use. Furthermore, the covering system 134 may be configured to particularly conform to the dimensions of the tractor 100.

Furthermore, in another embodiment, a method of covering a landscaping machine, such as the landscaping machines 10, 100 is contemplated. The method may include attaching an elongated rotatable member, such as the elongated rotatable members 30, 130, to a protective rollover bar, such as the protective rollover bars 22, 122. The elongated rotatable member has an attached covering system, such as the covering system 34, 134 described hereinabove. The covering system includes a front covering portion and a rear covering portion, such as the front and rear covering portions 36, 38. The method may further include rotating the elongated rotatable member. The method may then include unrolling the covering system such that the front covering portion extends to a front end of the landscaping machine and the rear covering portion extends to a rear end of the landscaping machine simultaneously. The method may then include rolling up the covering system from an unrolled state such that the front covering system and the rear covering system tightly surround the elongated rotatable member. The method may further include attaching at least one of the front covering portion and the rear covering portion to the landscaping machine. The method may further include overlapping and attaching an edge of the front covering portion with an edge of the rear covering portion.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A landscaping machine comprising:
a protective rollover bar having a left bar portion extending from a left side of an operator seat, a top bar portion extending from the left bar portion above the operator seat, and a right bar portion extending from the top bar portion to a right side of the operator seat;
an elongated rotatable member affixed to the protective rollover bar, the elongated rotatable member extending between and attached to the left bar portion and the right bar portion; and
a covering system attached to the elongated rotatable member configured to be rolled and unrolled with rotation of the elongated rotatable member;
wherein the covering system includes a front covering portion and a rear covering portion, wherein the front covering portion is configured to cover a front of the landscaping machine in an unrolled state, and wherein the rear covering portion is configured to cover a rear of the landscaping machine in the unrolled state.

2. The landscaping machine of claim 1, wherein the front covering portion and the rear covering portion are rolled and unrolled simultaneously.

3. The landscaping machine of claim 1, further comprising a turnable handle attached to the elongated rotatable member for rotating the elongated rotatable member, wherein the turnable handle is attached outside the protective rollover bar.

4. The landscaping machine of claim 1, wherein the landscaping machine is at least one of a lawnmower and a tractor.

5. The landscaping machine of claim 1, wherein the front covering portion includes a left foldable flap and a right foldable flap.

6. The landscaping machine of claim 5, wherein the back covering portion includes a left foldable flap and a right foldable flap.

7. The landscaping machine of claim 1, wherein the front covering portion and the back covering portion are dimensioned to tightly fit around the dimensions of the landscaping machine.

8. A landscaping machine comprising:
a protective rollover bar having a left bar portion extending from a left side of an operator seat, a top bar portion extending from the left bar portion above the operator seat, and a right bar portion extending from the top bar portion to a right side of the operator seat;
an elongated rotatable member affixed to the protective rollover bar at a location between a front end of the landscaping machine and a rear end of the landscaping machine, the elongated rotatable member extending between and attached to the left bar portion of the protective rollover bar and the right bar portion of the protective rollover bar; and a covering system attached to the elongated rotatable member configured to be rolled and unrolled with rotation of the elongated rotatable member, wherein the covering system includes a front covering portion and a rear covering portion, wherein the front covering portion is configured to extend to the front end of the landscaping machine in an unrolled state, and wherein the rear covering portion is configured to extend to the rear end of the landscaping machine in the unrolled state, wherein the front covering portion and the rear covering portion are rolled and unrolled simultaneously.

9. The landscaping machine of claim 8, further comprising a turnable handle attached to the elongated rotatable member for rotating the elongated rotatable member.

10. The landscaping machine of claim 8, further comprising a turnable handle attached to the elongated rotatable member for rotating the elongated rotatable member, wherein the turnable handle is attached outside the protective rollover bar.

11. The landscaping machine of claim 8, wherein the landscaping machine is at least one of a lawnmower and a tractor.

12. The landscaping machine of claim 8, wherein the front covering portion includes a left foldable flap and a right foldable flap.

13. The landscaping machine of claim 12, wherein the rear covering portion includes a left foldable flap and a right foldable flap.

14. The landscaping machine of claim 8, wherein the front covering portion and the back covering portion are dimensioned to tightly fit around the dimensions of the landscaping machine.

15. A landscaping machine cover comprising:
an elongated rotatable member affixable to a protective rollover bar of a landscaping machine, the protective rollover bar including a left bar portion, a top bar portion and a right bar portion, the elongated rotatable member attached to and extending between the left bar portion and the right bar portion; and a covering system attached to the elongated rotatable member configured to be rolled and unrolled with rotation of the elongated rotatable member, wherein the covering system includes a front covering portion and a rear covering portion, wherein the front covering portion is configured to extend in a first direction in an unrolled state, and wherein the rear covering portion is configured to extend in a second direction opposite the first direction in the unrolled state, wherein the front covering portion and the rear covering portion are rolled and unrolled simultaneously.

16. The landscaping machine cover of claim 15, further comprising a turnable handle attachable to the elongated rotatable member for rotating the elongated rotatable member rolling and unrolling the covering system.

17. A method of covering a landscape machine comprising:
attaching an elongated rotatable member to a protective rollover bar of the landscaping machine, the protective rollover bar having a left bar portion, a top bar portion, and a right bar portion, the elongated rotatable member attached to and extending between the left bar portion and the right bar portion, wherein the elongated rotatable member has an attached covering system, the covering system including a front covering portion and a rear covering portion;

rotating the elongated rotatable member;

unrolling the covering system such that the front covering portion extends to a front end of the landscaping machine and the rear covering portion extends to a rear end of the landscaping machine simultaneously; and rolling up the covering system from an unrolled state such that the front covering portion and the rear covering portion tightly surround the elongated rotatable member.

\* \* \* \* \*